(12) United States Patent
Zhu et al.

(10) Patent No.: US 11,646,769 B1
(45) Date of Patent: May 9, 2023

(54) TECHNIQUES FOR THROUGHPUT-CONSTRAINED BEAM MANAGEMENT

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/538,469

(22) Filed: Nov. 30, 2021

(51) Int. Cl.
*H04B 7/02* (2018.01)
*H04B 7/0404* (2017.01)
*H04W 52/24* (2009.01)
*H04B 7/0426* (2017.01)

(52) U.S. Cl.
CPC ......... *H04B 7/0404* (2013.01); *H04B 7/0426* (2013.01); *H04W 52/241* (2013.01)

(58) Field of Classification Search
CPC .. H04B 7/0404; H04B 7/0426; H04W 52/241
USPC ........ 375/267, 261, 260, 259, 219, 295, 316
See application file for complete search history.

(56) References Cited

U.S. PATENT DOCUMENTS 11,159,213 B2 * 10/2021 Zhang ................... H04L 5/0057

FOREIGN PATENT DOCUMENTS

WO 2021098965 A1 5/2021

OTHER PUBLICATIONS

International Search Report and Written Opinion—PCT/US2022/078987—ISA/EPO—dated Jan. 27, 2023.
Qualcomm Incorporated: "UE Adaptation to the Traffic and UE Power Consumption Characteristics", 3GPP TSG-RAN WG1 Meeting #94bis, R1-1811282, UE Adaptation for Power Saving, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, pp. 1-17, XP051518685, Section 2.3, Adaptation in Number of Antennas.

(Continued)

*Primary Examiner* — Zewdu A Kassa
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may estimate, for each beam at one or more beam levels on one or more antenna panels, an application layer throughput based at least in part on a reference signal received power measurement, wherein the one or more beam levels are each associated with a number of antenna elements. The UE may generate a set of candidate beams that includes, at each of the one or more beam levels, one or more beams for which the respective estimated application layer throughput satisfies an application layer throughput requirement. The UE may select, from the set of candidate beams, a serving beam for which the estimated application layer throughput satisfies the application layer throughput requirement with a fewest number of antenna elements. Numerous other aspects are described.

30 Claims, 7 Drawing Sheets

(56) References Cited

OTHER PUBLICATIONS

VIVO: "Discussion on Multi-Beam Enhancement", 3GPP TSG RAN WG1 #102-e, R1-2005363, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917388, 21 Pages, paragraph [0005], Section 6, the whole document.

* cited by examiner

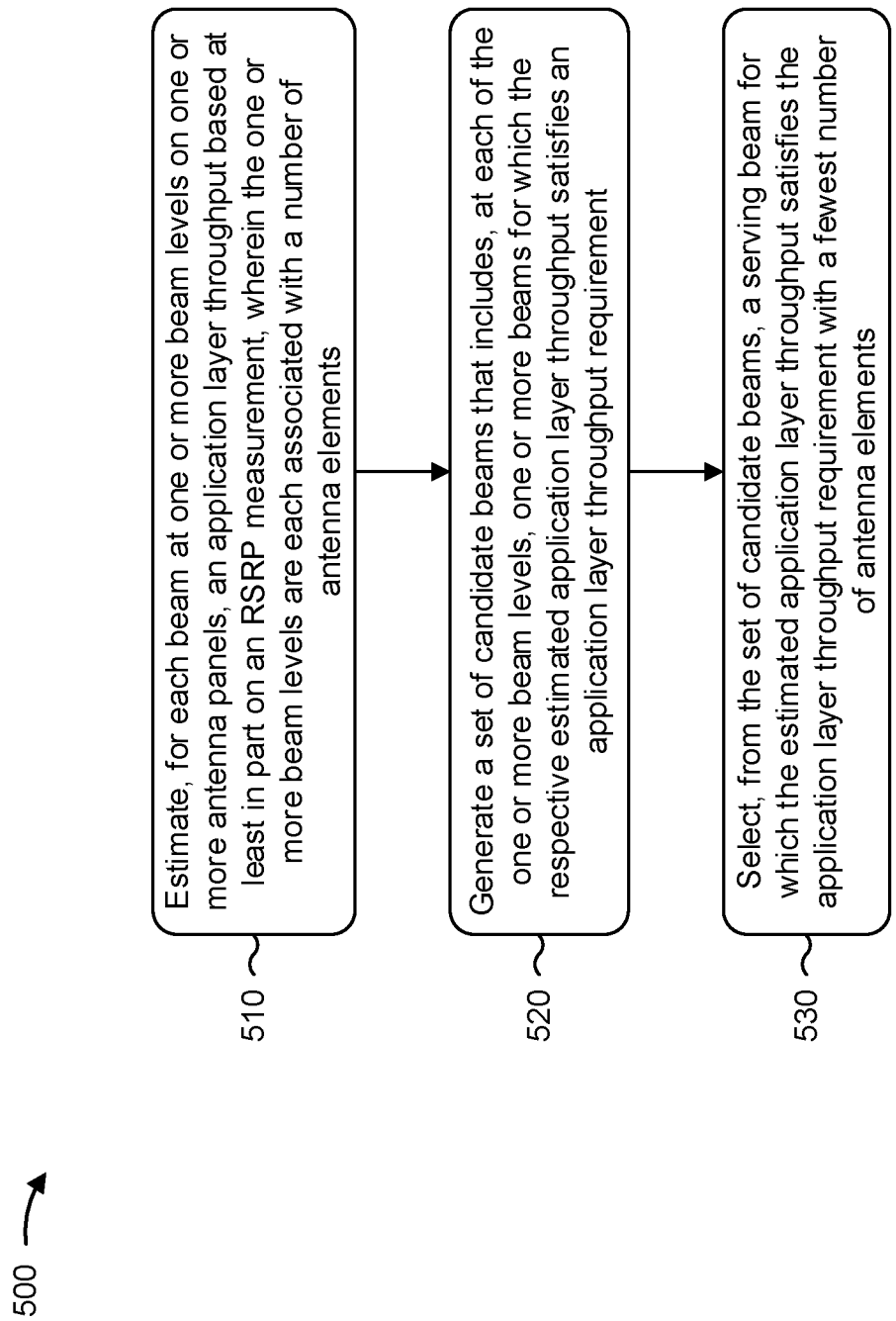

TECHNIQUES FOR THROUGHPUT-CONSTRAINED BEAM MANAGEMENT

FIELD OF THE DISCLOSURE

Aspects of the present disclosure generally relate to wireless communication and to techniques and apparatuses for beam management based on spectral efficiency.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to estimate, for each beam at one or more beam levels on one or more antenna panels, an application layer throughput based at least in part on a reference signal received power (RSRP) measurement, wherein the one or more beam levels are each associated with a number of antenna elements. The one or more processors may be configured to generate a set of candidate beams that includes, at each of the one or more beam levels, one or more beams for which the respective estimated application layer throughput satisfies an application layer throughput requirement. The one or more processors may be configured to select, from the set of candidate beams, a serving beam for which the estimated application layer throughput satisfies the application layer throughput requirement with a fewest number of antenna elements.

Some aspects described herein relate to a method of wireless communication performed by a UE. The method may include estimating, for each beam at one or more beam levels on one or more antenna panels, an application layer throughput based at least in part on an RSRP measurement, wherein the one or more beam levels are each associated with a number of antenna elements. The method may include generating a set of candidate beams that includes, at each of the one or more beam levels, one or more beams for which the respective estimated application layer throughput satisfies an application layer throughput requirement. The method may include selecting, from the set of candidate beams, a serving beam for which the estimated application layer throughput satisfies the application layer throughput requirement with a fewest number of antenna elements.

Some aspects described herein relate to a non-transitory computer-readable medium that stores a set of instructions for wireless communication by a UE. The set of instructions, when executed by one or more processors of the UE, may cause the UE to estimate, for each beam at one or more beam levels on one or more antenna panels, an application layer throughput based at least in part on an RSRP measurement, wherein the one or more beam levels are each associated with a number of antenna elements. The set of instructions, when executed by one or more processors of the UE, may cause the UE to generate a set of candidate beams that includes, at each of the one or more beam levels, one or more beams for which the respective estimated application layer throughput satisfies an application layer throughput requirement. The set of instructions, when executed by one or more processors of the UE, may cause the UE to select, from the set of candidate beams, a serving beam for which the estimated application layer throughput satisfies the application layer throughput requirement with a fewest number of antenna elements.

Some aspects described herein relate to an apparatus for wireless communication. The apparatus may include means for estimating, for each beam at one or more beam levels on one or more antenna panels, an application layer throughput based at least in part on an RSRP measurement, wherein the one or more beam levels are each associated with a number of antenna elements. The apparatus may include means for generating a set of candidate beams that includes, at each of the one or more beam levels, one or more beams for which the respective estimated application layer throughput satisfies an application layer throughput requirement. The apparatus may include means for selecting, from the set of candidate beams, a serving beam for which the estimated application layer throughput satisfies the application layer throughput requirement with a fewest number of antenna elements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process associated with throughput-constrained beam management, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
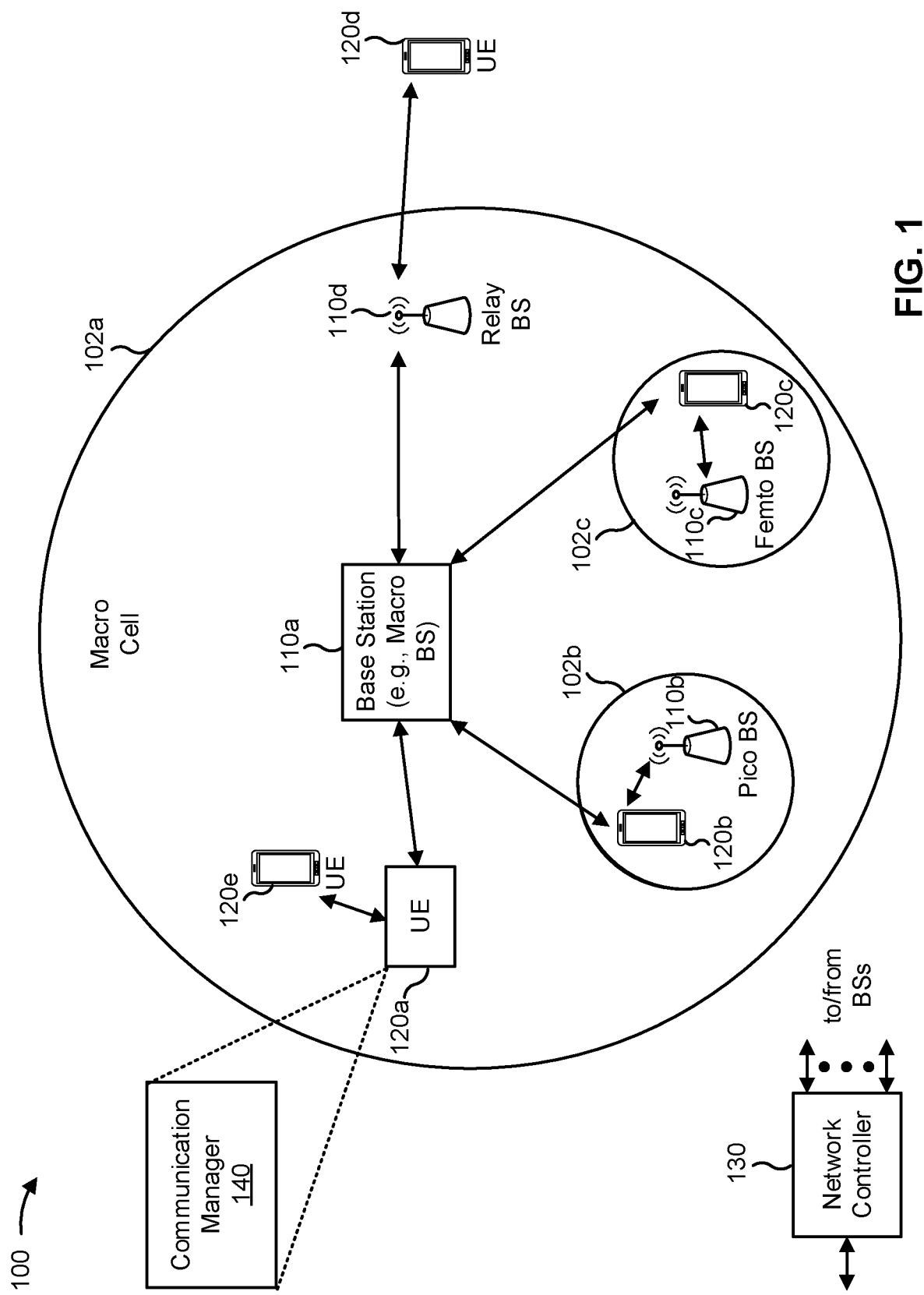
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may estimate, for each beam at one or more beam levels on one or more antenna panels, an application layer throughput based at least in part on a reference signal received power (RSRP) measurement, wherein the one or more beam levels are each associated with a number of antenna elements; generate a set of candidate beams that includes, at each of the one or more beam levels, one or more beams for which the respective estimated application layer throughput satisfies an application layer throughput requirement; and select, from the set of candidate beams, a serving beam for which the estimated application layer throughput satisfies the application layer throughput requirement with a fewest number of antenna elements. Additionally, or alternatively, the communication manager 140 may perform one or more other operations described herein.

As indicated above, FIG. 1 is provided as an example. Other examples may differ from what is described with regard to FIG. 1.

Figure 2:
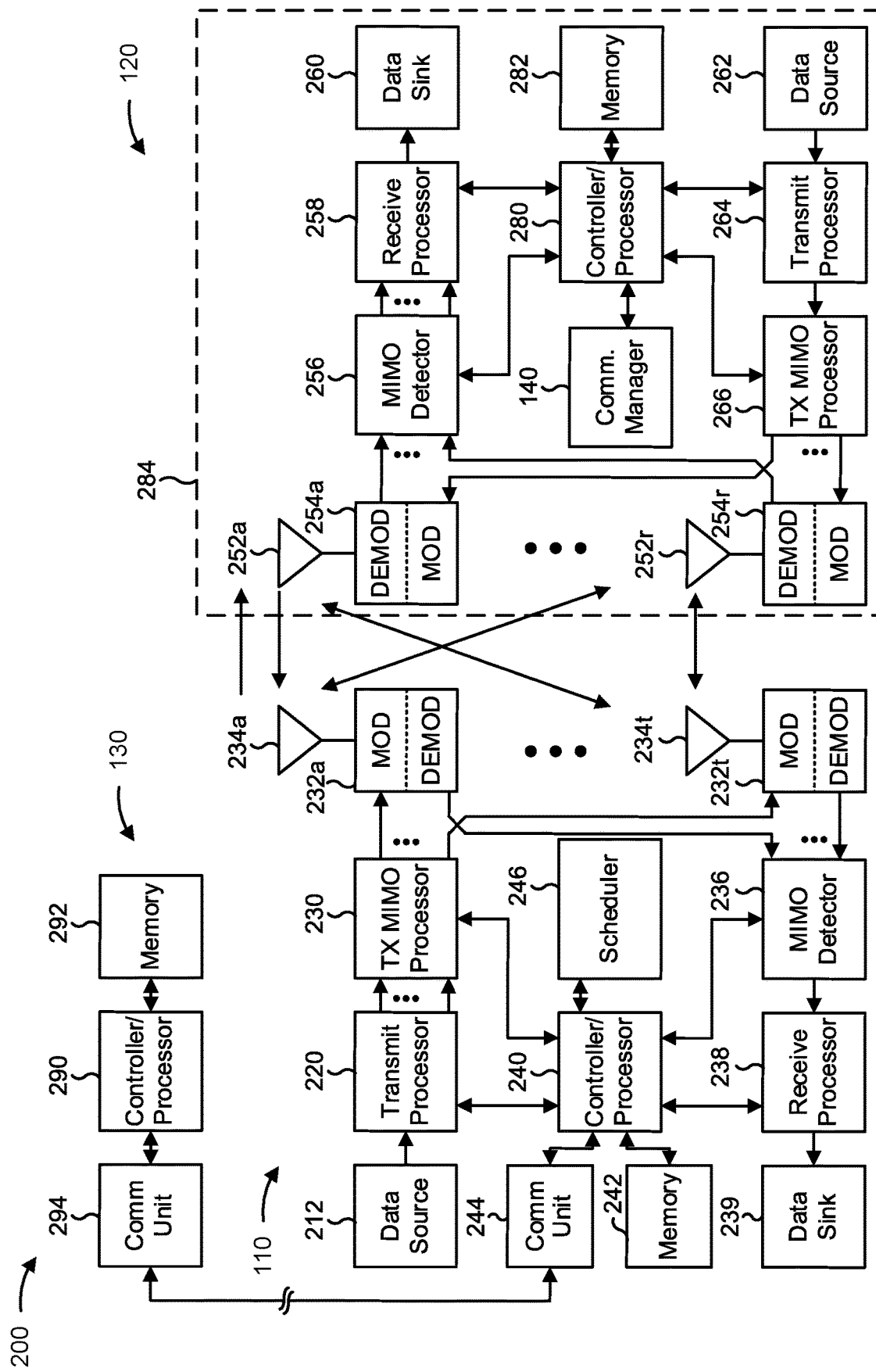
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-4B, FIG. 5, and/or FIG. 6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-4B, FIG. 5, and/or FIG. 6).

The controller/processor 240 of the base station 110, the controller/processor 280 of the UE 120, and/or any other component(s) of FIG. 2 may perform one or more techniques associated with throughput-constrained beam management, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, the UE 120 includes means for estimating, for each beam at one or more beam levels on one or more antenna panels, an application layer throughput based at least in part on an RSRP measurement, wherein the one or more beam levels are each associated with a number of antenna elements; means for generating a set of candidate beams that includes, at each of the one or more beam levels, one or more beams for which the respective estimated application layer throughput satisfies an application layer throughput requirement; and/or means for selecting, from the set of candidate beams, a serving beam for which the estimated application layer throughput satisfies the application layer throughput requirement with a fewest number of antenna elements. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
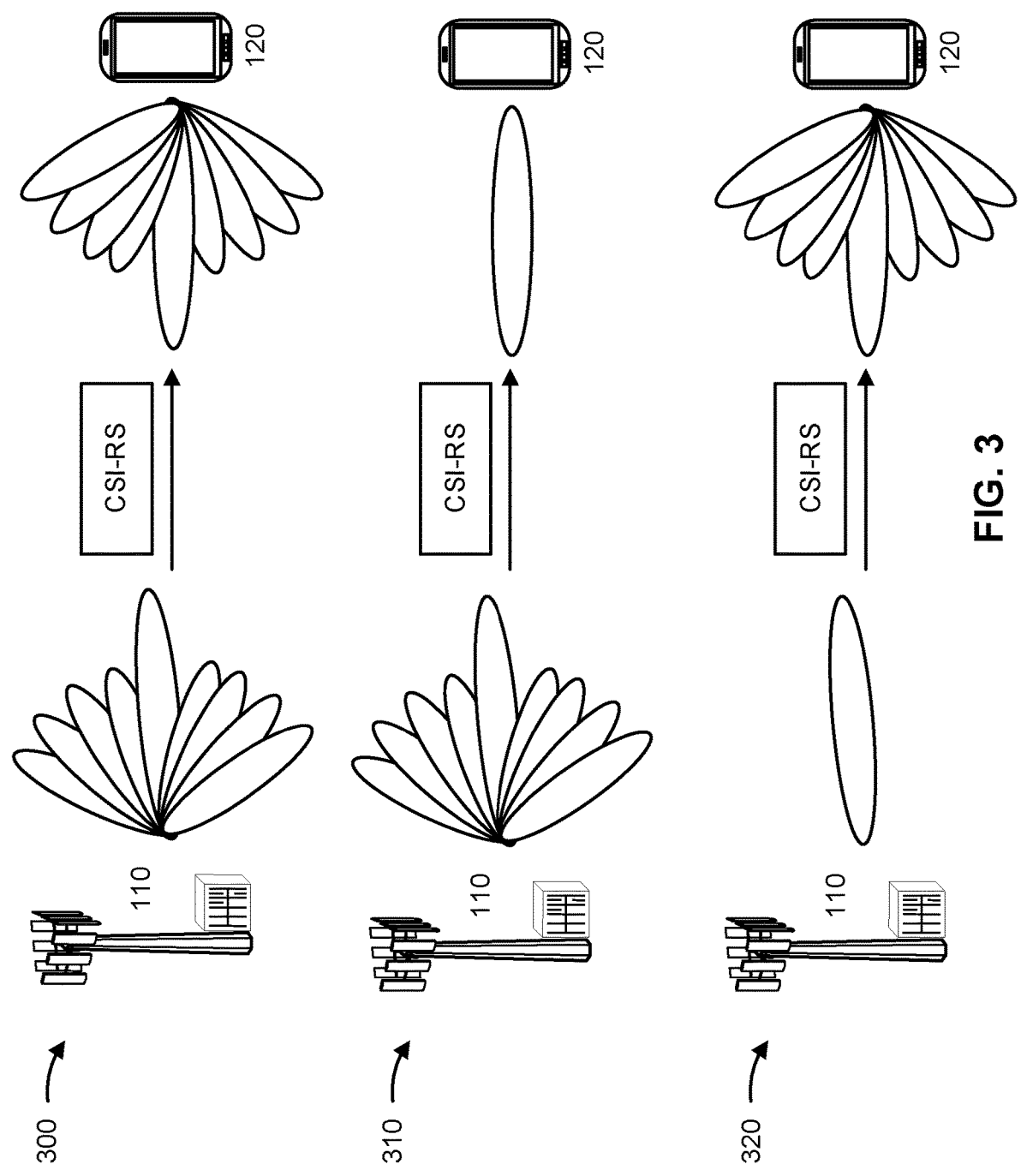
FIG. 3 is a diagram illustrating examples of beam management procedures, in accordance with the present disclosure.

FIG. 3 is a diagram illustrating examples 300, 310, 320 of beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using channel state information reference signals (CSI-RSs). Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same CSI-RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management procedure may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same CSI-RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

In some cases, the UE 120 and the base station 110 may use beamforming to improve performance associated with downlink and/or uplink communication over a millimeter wave (mmW) channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the base station 110 to counter the propagation loss in a mmW channel and thereby improve performance for mmW communication. For example, to achieve a beamforming gain on a downlink, the base station 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction and the base station 110 may generate a corresponding downlink receive beam. In some cases, the UE 120 may be permitted to select the downlink receive beam to optimize reception of a downlink transmission from the base station 110 and/or may be permitted to select the uplink transmit beam to optimize reception at the base station 110 for an uplink transmission by the UE 120.

When the UE 120 generates a downlink receive beam and/or an uplink transmit beam, the UE 120 may generally be configured to use a beam with a maximum number of antenna elements on a best antenna panel in order to achieve a maximum beamforming gain. For example, the UE 120 may be equipped with one or more antenna panels that each include multiple antenna elements, where each antenna element may include one or more sub-elements to radiate or receive radio frequency (RF) signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range. Accordingly, the shape of a beam (e.g., the amplitude, width, and/or presence of side lobes) and the direction of the beam (e.g., an angle of the beam relative to a surface of the antenna panel) can be dynamically controlled to achieve a maximum beamforming gain by selecting a beam with a largest number of antenna elements on the best antenna panel (e.g., an antenna panel associated with strongest RSRP measurements).

However, in some cases, using a beam with a largest or maximum number of antenna elements and/or using a beam on the best antenna panel may be associated with one or more drawbacks. For example, power consumption at the UE 120 may generally be related to the number of antenna elements used to form a beam, whereby using a beam with a maximum number of antenna elements may increase power consumption at the UE 120. Furthermore, in cases where the UE 120 generates a downlink receive beam in favorable channel conditions (e.g., low pathloss), the receive chain of the UE 120 may saturate such that using a maximum number of antenna elements increases power consumption without offering any increase to the achievable beamforming gain (e.g., the same beamforming gain may be achieved using fewer antenna elements). Furthermore, in some cases, the best antenna panel (in terms of achievable beamforming gain) may not be preferable due to other constraints at the UE 120. For example, the UE 120 may be experiencing a thermal impact (e.g., overheating) in one or more hardware blocks that coexist with (e.g., are included in or in proximity to) the best antenna panel. In such cases, the UE 120 may prefer to use a different antenna panel that does not coexist with (e.g., is not included in or in proximity to) the one or more hardware blocks experiencing the thermal impact in order to control temperature via the antenna elements that are used to generate a beam. Additionally, or alternatively, the UE 120 may be subject to one or more maximum permissible exposure (MPE) restrictions that limit a peak effective isotropic radiated power (EIRP) that can be directed toward the human body due to potential dangers to human tissue near the UE 120 (e.g., handheld mobile phones and/or desktop devices that may be used in close proximity to the user). Accordingly, when one or more beams on the best antenna panel are subject to an MPE restriction, the UE 120 may prefer to generate a transmit beam using a different antenna panel with beams that are not subject to an MPE restriction or are subject to lesser MPE restrictions than the beams on the best antenna panel.

However, in some cases, using a beam with a fewer number of antenna elements and/or a beam on an antenna panel other than the best antenna panel may degrade performance (e.g., by reducing the beamforming gain and thereby reducing an uplink or downlink data rate). Accordingly, some aspects described herein relate to techniques and apparatuses to enable throughput-constrained beam management, where a UE 120 may use a beam on a preferred antenna panel with a minimum number of antenna elements that can satisfy an application layer throughput requirement (e.g., a requested or required uplink or downlink data rate). For example, in some aspects, the UE 120 may identify one or more candidate beams on a best antenna panel and/or a preferred antenna panel that can satisfy the application layer throughput requirement, and may select a candidate beam that can satisfy the application layer throughput requirement using a fewest number of antenna elements. In this way, the UE 120 may select a serving beam that satisfies the application layer throughput requirement at a lowest level, which may reduce power consumption without compromising performance. Furthermore, in cases where one or more beams on the preferred antenna panel (e.g., an antenna panel not subject to a thermal impact or an MPE restriction) satisfy the application layer throughput requirement, the serving beam may be a beam that can satisfy the application layer throughput requirement with a fewest number of antenna elements on the preferred antenna panel. In this way, the UE 120 may dynamically control which antenna panel is used to generate the beam, to mitigate other potential conditions (e.g., a thermal impact or an MPE restriction) without compromising performance by selecting a beam that can satisfy the application layer throughput requirement on the preferred antenna panel.

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4A:
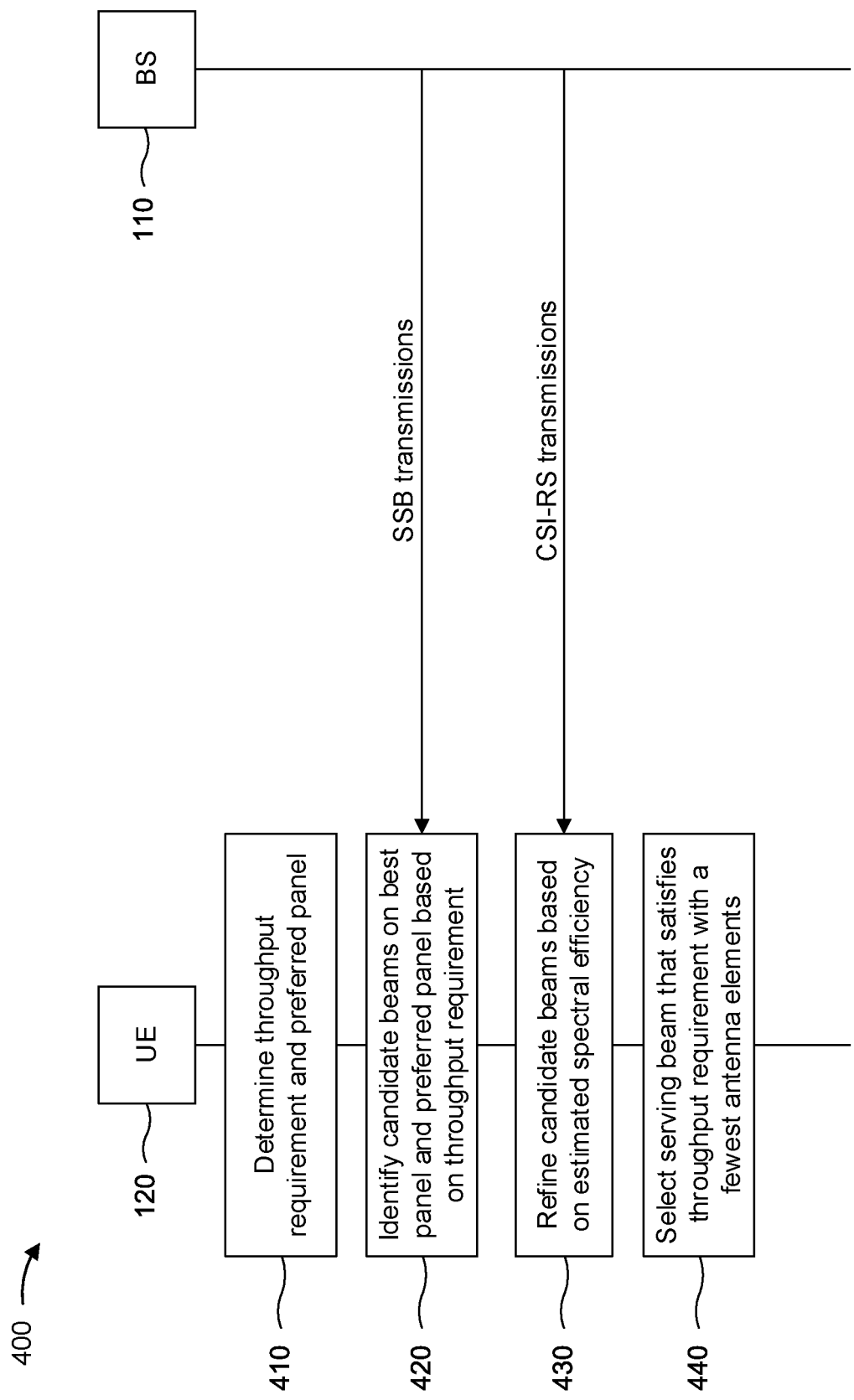
FIGS. 4A-4B are diagrams illustrating examples associated with throughput-constrained beam management, in accordance with the present disclosure.
Figure 4B:
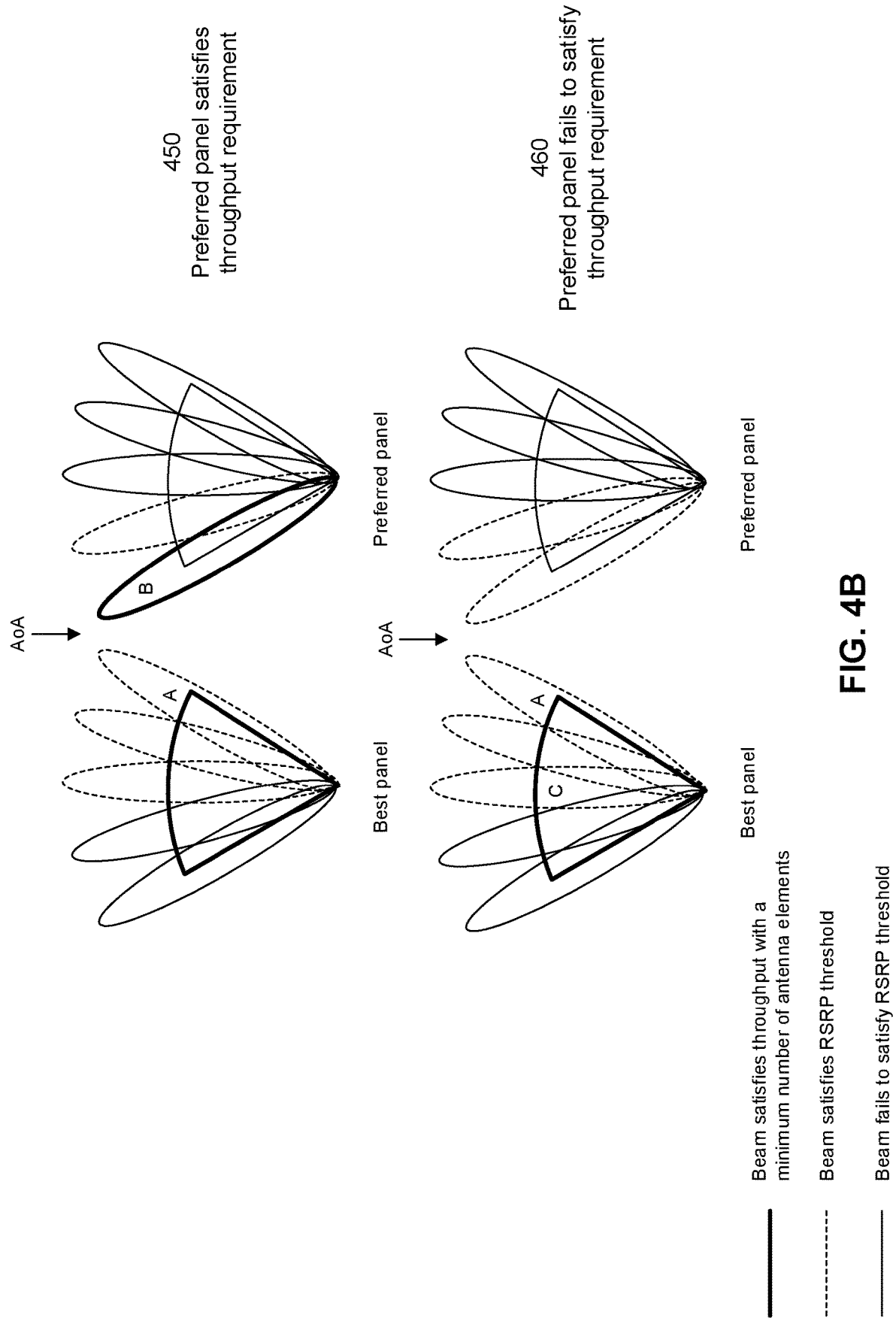

FIGS. 4A-4B are diagrams illustrating an example 400 associated with throughput-constrained beam management, in accordance with the present disclosure. As shown in FIG. 4A, example 400 includes communication between a base station 110 and a UE 120 in a wireless network (e.g., wireless network 100) via a wireless access link, which may include an uplink and a downlink.

As shown in FIG. 4A, and by reference number 410, the UE 120 may determine an application layer throughput requirement and a preferred antenna panel to use to generate a beam for downlink and/or uplink communication. For example, in some aspects, the UE 120 may be configured to determine one or more applications that are running on the UE 120, and may determine the application layer throughput requirement based on a minimum downlink and/or uplink data rate for the one or more applications (e.g., in kilobits per second (kbps) or megabits per second (Mbps)). For example, in some aspects, the minimum downlink and/or uplink data rate may be determined based on an application type or category. For example, one or more low data rate applications (e.g., web browsing or a Voice over Internet Protocol (VoIP) call) may be associated with a first application layer throughput requirement (e.g., a value in a range from 0 to 10 Mbps), one or more moderate data rate applications (e.g., video streaming or gaming) may be associated with a second application layer throughput requirement (e.g., a value in a range from 10 to 100 Mbps), and/or one or more high data rate applications (e.g., a network speed test or a large file download) may be associated with a third application layer throughput requirement (e.g., a value above 100 Mbps). Additionally, or alternatively, one or more applications running on the UE 120 may be associated with an application-specific throughput requirement. Accordingly, as described herein, the UE 120 may generally have a capability to determine one or more applications that are running on the UE 120 (e.g., including applications running in the foreground and/or the background) and to determine a total application layer throughput requirement (e.g., downlink and/or uplink data rate) for the running application(s).

Furthermore, in some aspects, the UE 120 may be configured to determine the preferred antenna panel based at least in part on one or more settings of the UE 120. For example, in some aspects, the UE 120 may have a capability to identify one or more antenna panels that are impacted by a condition of the UE 120, and may identify the preferred antenna panel to mitigate or otherwise manage the condition of the UE 120. For example, in some aspects, the UE 120 may have a capability to identify one or more hardware blocks that are causing or experiencing a thermal impact (e.g., overheating) and to identify one or more antenna panels that coexist with the hardware blocks that are causing or experiencing the thermal impact. Accordingly, the settings of the UE 120 may designate an antenna panel that does not coexist with the hardware blocks that are causing or experiencing the thermal impact as the preferred antenna panel until the thermal impact has been adequately resolved. Additionally, or alternatively, the UE 120 may detect that a hand or other human body part is in proximity to an antenna panel such that one or more beams on the antenna panel are subject to an MPE restriction (e.g., to reduce a maximum transmit power via the one or more beams and/or disallowing the UE 120 from using the one or more beams subject to the MPE restriction). Accordingly, in this example, the settings of the UE 120 may designate an antenna panel that is not subject to the MPE restriction (e.g., an antenna panel facing away from the hand or other human body part causing the MPE issue) as the preferred antenna panel until the MPE issue has been adequately resolved. Additionally, or alternatively, the settings of the UE 120 may designate the preferred antenna panel to mitigate or manage other suitable conditions of the UE 120 (e.g., low battery power).

As further shown in FIG. 4A, and by reference number 420, the UE 120 may use measurements associated with a set of SSBs transmitted by the base station 110 to identify a set of candidate beams including one or more candidate beams on a best antenna panel and/or the preferred antenna panel that can satisfy the application layer throughput requirement. For example, the base station 110 may be configured to transmit a synchronization signal (SS) burst set at periodic intervals (e.g., every X milliseconds), where the SS burst set may include multiple SS bursts, with each SS burst including one or more SSBs that carry a primary synchronization signal (PSS), a secondary synchronization signal (SSS), and/or a physical broadcast channel (PBCH). In some aspects, multiple SSBs may be included in an SS burst (e.g., with transmission on different beams), and the PSS, the SSS, and/or the PBCH may be the same across each SSB in the SS burst. Accordingly, different SSBs may be beam-formed differently (e.g., transmitted using different beams), and may be used for cell search, cell acquisition, beam management, and/or beam selection. For example, in some aspects, the UE 120 may monitor and/or measure SSBs using different receive beams during an initial network access procedure, a beam selection procedure, and/or a beam refinement procedure, among other examples. Accordingly, because the SSB transmissions are always-on signaling that the UE 120 can use to identify strong beams that can satisfy the application layer throughput requirements, the UE 120 may use RSRP measurements associated with the SSB transmissions to identify the best antenna panel and to identify the candidate beam(s) on the best antenna panel and/or the preferred antenna panel that can satisfy the application layer throughput requirement.

For example, based on RSRP measurements associated with the SSB transmissions received by the UE 120, the UE 120 may determine, among multiple antenna panels of the UE 120, an antenna panel that provides a maximum beamforming gain. Accordingly, the antenna panel that provides the maximum beamforming gain may be designated the best antenna panel, which may be the same as or different from the preferred antenna panel. In some aspects, to identify the candidate beams on the best antenna panel and/or the preferred antenna panel, the UE 120 may perform a sweep of all beam levels on the best antenna panel and the preferred antenna panel, where each beam level corresponds to a number of antenna elements that are used to generate a beam. For example, if an antenna panel includes eight (8) antenna elements, the UE 120 may sweep through all beams at a lowest beam level (e.g., an omnidirectional beam using one (1) antenna element), a next-lowest beam level (e.g., relatively wide beams using two (2) antenna elements), all the way through a highest beam level (very narrow beams using eight (8) antenna elements). Accordingly, the UE 120 may measure an RSRP associated with an SSB transmission for each beam at each beam level on both the best antenna panel and the preferred antenna panel, and may use the RSRP measurement associated with the SSB received via each beam to estimate the application layer throughput associated with the respective beam. The UE 120 may then generate a set of candidate beams that includes one or more candidate beams on the best antenna panel and/or the preferred antenna panel that can satisfy the application layer throughput requirement. For example, in some aspects, the UE 120 may map the application layer throughput requirement to an RSRP threshold, and the set of candidate beams may include up to a configurable number of strong beams on the best panel and/or the preferred panel with RSRP measurements that satisfy the RSRP threshold.

In some aspects, to map the application layer throughput requirement to the RSRP threshold, the UE 120 may map the application layer throughput requirement to a physical layer throughput requirement. For example, the UE 120 may scale the application layer throughput requirement according to one or more header sizes to determine the physical layer throughput requirement. For example, the UE 120 may determine a smallest Internet Protocol (IP) packet size that can satisfy the application layer throughput requirement, and may determine a header size associated with each IP packet (e.g., a combined header size for a Packet Data Convergence Protocol (PDCP) header, a medium access control (MAC) header, and a radio link control (RLC) header associated with each packet). Accordingly, the UE 120 may determine the physical layer throughput requirement as the sum of the application layer throughput requirement and the header size, where the application layer throughput requirement may be scaled according to a parameter, $\alpha$, that is based on the application layer throughput requirement (e.g., $\alpha$ may have a value of 1.07 in an example where a smallest IP packet size is 100 bytes and a combined header size is 7 bytes based on a 3 byte PDCP header, a 2 byte MAC header, and a 2-byte RLC header). Accordingly, the UE 120 may determine the physical layer throughput requirement by scaling the application layer throughput requirement according to the value of $\alpha$ (e.g., physical layer throughput requirement=$\alpha$×application layer throughput requirement), and may then map the physical layer throughput requirement to a spectral efficiency requirement.

For example, in some aspects, the UE 120 may map the physical layer throughput requirement to an uplink spectral efficiency requirement and/or a downlink spectral efficiency requirement. For example, an uplink physical layer throughput requirement may be defined as the product of the number of active uplink component carriers, an uplink duty cycle, a resource block (RB) allocation for a given subcarrier spacing, and the uplink spectral efficiency. For example, the UE 120 may map the physical layer throughput requirement to an uplink spectral efficiency based on an equation of the form:

$$PHY_{UL} = CC_{UL} \times DC_{UL} \times N_{RB} \times 12 \times SCS \times SPEFF_{UL}$$

where $PHY_{UL}$ is the physical layer throughput requirement, $CC_{UL}$ is the number of active uplink component carriers (e.g., with a default value of one (1) assuming a primary component carrier only), $DC_{UL}$ is the uplink duty cycle (e.g., defined according to an RRC-configured time division duplexing (TDD) pattern using a scaling factor, X, where X has a default value of one (1) and X=½ means that the duty cycle is half of the RRC-configured TDD pattern in a two-user scenario), $N_{RB}$ is the full RB allocation for a given subcarrier spacing (e.g., 66 RBs for a 100 MHz bandwidth and a 120 kHz subcarrier spacing), SCS is the subcarrier spacing (in Hertz (Hz), and $SPEFF_{UL}$ is the uplink spectral efficiency. Similarly, a downlink physical layer throughput requirement may be defined as the product of the number of active downlink component carriers, a downlink duty cycle, the RB allocation for the given subcarrier spacing, and the downlink spectral efficiency, whereby the UE 120 may map the physical layer throughput requirement to a downlink spectral efficiency based on an equation of the form:

$$PHY_{DL}=CC_{DL} \times DC_{DL} \times N_{RB} \times 12 \times SCS \times SPEFF_{DL}$$

where $PHY_{UL}$ is the physical layer throughput requirement, $CC_{DL}$ is the number of active downlink component carriers (e.g., with a default value of one (1) assuming a primary component carrier only), $DC_{DL}$ is the downlink duty cycle (e.g., defined according to the RRC-configured TDD pattern), and $SPEFF_{DL}$ is the downlink spectral efficiency. Accordingly, based on the estimated uplink and/or downlink spectral efficiency requirement, the UE 120 may determine an uplink and/or downlink signal-to-noise ratio (SNR) requirement as $SPEFF=\log 2(1+sum(SNR_{UL}, SNR_{DL}))$, which may then be mapped to the RSRP threshold at which an RSRP measurement associated with an SSB satisfies the application layer throughput requirement, as follows:

$$SNR_{DL}=RSRP_{SSB}-(NF_{UE}+10 \log_{10}(SCS)+10 \log_{10} (num\_antennas)-174),$$

where $RSRP_{SSB}$ is the RSRP measurement of an SSB in decibels (dB), $NF_{UE}$ is a noise figure that measures SNR degradation at the UE 120, num_antennas is a number of antenna elements, and $SNR_{DL}$ is the estimated downlink SNR requirement (in dB). Furthermore, the uplink SNR may be similarly estimated, except the uplink SNR may further consider a maximum transmit power that may be updated every 10 milliseconds on a per-beam basis based on any MPE impact or other transmit power constraints in effect at the UE 120. For example, in some aspects, an uplink SNR requirement may be mapped to the RSRP threshold at which an RSRP measurement associated with an SSB satisfies the application layer throughput requirement, as follows:

$$SNR_{UL}=Pmax+RSRP_{SSB}-TxPower_{BS}-(NF_{BS}+10 \log_{10}(SCS)-174),$$

where Pmax is the maximum transmit power associated with the beam, $RSRP_{SSB}-TxPower_{BS}$ defines a path loss between the UE 120 and the base station 110 based on a difference between the received power of a downlink reference signal and an actual transmit power used by the base station 110, $NF_{BS}$ is a noise figure that measures SNR degradation at the base station 110, $(NF_{BS}+10 \log_{10}(SCS)-174)$ defines an estimated noise power at the base station 110, and $SNR_{UL}$ is the uplink SNR requirement (in dB).

Accordingly, as described herein, the UE 120 may generally sweep all beam levels on both the best antenna panel and the preferred antenna panel to measure an RSRP associated with an SSB per beam, and may use the RSRP measurement associated with the SSB received via each respective beam to estimate the application layer throughput associated with each beam (e.g., using the various equations provided above to map the RSRP measurement to an application layer throughput based on one or more intermediate mappings to an SNR value, a spectral efficiency, and a physical layer throughput). Additionally, or alternatively, the application layer throughput requirement may be mapped to an RSRP threshold as described above, whereby the RSRP measurement associated with the SSB received via each respective beam may be compared with the RSRP threshold.

As further shown in FIG. 4A, and by reference number 430, the UE 120 may refine the set of candidate beams based on an estimated spectral efficiency per candidate beam, where the spectral efficiency per candidate beam may be estimated based on one or more CSI-RS transmissions by the base station 110. For example, in some aspects, the UE 120 may sweep through each candidate beam in the set of candidate beams at one or more CSI-RS occasions, and may estimate a spectral efficiency associated with each CSI-RS transmission (e.g., using the various equations provided above) to confirm that the required application layer throughput can be achieved on the corresponding candidate beam. For example, in some aspects, the UE 120 may remove, from the set of candidate beams, one or more candidate beams associated with an estimated spectral efficiency that fails to satisfy the application layer throughput requirement.

As further shown in FIG. 4A, and by reference number 440, the UE 120 may select a serving beam to be used for uplink and/or downlink communication. For example, in some aspects, the serving beam may be selected for communication on a physical uplink control channel (PUCCH), a physical uplink shared channel (PUSCH), a physical downlink control channel (PDCCH), and/or a physical downlink shared channel (PDSCH). In some aspects, in cases where the preferred antenna panel differs from the best antenna panel (e.g., due to thermal or MPE mitigation taking precedence over optimizing an uplink or downlink data rate), the UE 120 may determine whether one or more candidate beams on the preferred antenna panel satisfy the application layer throughput requirement. In cases where there is at least one candidate beam on the preferred antenna panel that satisfies the application layer throughput requirement, the serving beam that is selected by the UE 120 may be a candidate beam on the preferred antenna panel that satisfies the application layer throughput requirement at a lowest beam level (e.g., with a fewest number of antenna elements). Alternatively, in cases where all of the candidate beams on the preferred antenna panel fail to satisfy the application layer throughput requirement, the serving beam that is selected by the UE 120 may be a candidate beam on the best antenna panel that satisfies the application layer throughput requirement at a lowest beam level.

For example, FIG. 4B illustrates an example 450 where the preferred antenna panel includes at least one candidate beam that satisfies the application layer throughput requirement and an example 460 where the preferred antenna panel does not include any candidate beams that satisfy the application layer throughput requirement. For example, as shown in FIG. 4B, the width of a beam may be related to the number of antenna elements that are used to form the beam, where a narrower beam may generally be associated with a larger number of antenna elements. As further shown in FIG. 4B, a beam that fails to satisfy the RSRP threshold mapped to the application layer throughput requirement (e.g., a beam that is not considered a candidate beam) is shown by a thin solid line, a beam that satisfies the RSRP threshold mapped to the application layer throughput requirement (e.g., a potential candidate beam) is shown by a dashed line, and a beam that satisfies the application layer throughput requirement with a minimum or fewest number of antenna elements is shown by a thick solid line. As shown in in example 450, the preferred panel includes a beam that satisfies the application layer throughput requirement, which may be selected as the serving beam. Alternatively, as shown in example 460, there are no beams on the preferred panel that satisfy the application layer throughput requirement, in which case a beam on the best antenna panel that satisfies the application layer throughput requirement with a fewest number of antenna elements may be selected as the serving beam. In this way, the UE 120 may select a serving beam that satisfies the application layer throughput requirement at a lowest level, which may reduce power consumption without compromising performance. Furthermore, in cases where one or more beams on the preferred antenna panel are able to satisfy the application layer throughput requirement, the serving beam may be selected on the preferred antenna panel to allow the UE 120 to mitigate or manage other potential conditions (e.g., a thermal impact or an MPE restriction) without compromising performance.

As indicated above, FIGS. 4A-4B are provided as an example. Other examples may differ from what is described with regard to FIGS. 4A-4B.

FIG. 5 is a diagram illustrating an example process 500 performed, for example, by a UE, in accordance with the present disclosure. Example process 500 is an example where the UE (e.g., UE 120) performs operations associated with techniques for throughput-constrained beam management.

As shown in FIG. 5, in some aspects, process 500 may include estimating, for each beam at one or more beam levels on one or more antenna panels, an application layer throughput based at least in part on a reference signal received power (RSRP) measurement, wherein the one or more beam levels are each associated with a number of antenna elements (block 510). For example, the UE (e.g., using communication manager 140 and/or throughput estimation component 608, depicted in FIG. 6) may estimate, for each beam at one or more beam levels on one or more antenna panels, an application layer throughput based at least in part on an RSRP measurement, wherein the one or more beam levels are each associated with a number of antenna elements, as described above.

As further shown in FIG. 5, in some aspects, process 500 may include generating a set of candidate beams that includes, at each of the one or more beam levels, one or more beams for which the respective estimated application layer throughput satisfies an application layer throughput requirement (block 520). For example, the UE (e.g., using communication manager 140 and/or beam selection component 612, depicted in FIG. 6) may generate a set of candidate beams that includes, at each of the one or more beam levels, one or more beams for which the respective estimated application layer throughput satisfies an application layer throughput requirement, as described above.

As further shown in FIG. 5, in some aspects, process 500 may include selecting, from the set of candidate beams, a serving beam for which the estimated application layer throughput satisfies the application layer throughput requirement with a fewest number of antenna elements (block 530). For example, the UE (e.g., using communication manager 140 and/or beam selection component 612, depicted in FIG. 6) may select, from the set of candidate beams, a serving beam for which the estimated application layer throughput satisfies the application layer throughput requirement with a fewest number of antenna elements, as described above.

Process 500 may include additional aspects, such as any single aspect or any combination of aspects described below and/or in connection with one or more other processes described elsewhere herein.

In a first aspect, the application layer throughput is estimated for each beam based at least in part on the RSRP measurement associated with an SSB received via the respective beam.

In a second aspect, alone or in combination with the first aspect, process 500 includes estimating a spectral efficiency for each beam in the set of candidate beams, wherein the serving beam is selected from one or more beams in the set of candidate beams for which the spectral efficiency satisfies the application layer throughput requirement.

In a third aspect, alone or in combination with one or more of the first and second aspects, the spectral efficiency is estimated for each beam in the set of candidate beams based at least in part on a CSI-RS received via the respective beam.

In a fourth aspect, alone or in combination with one or more of the first through third aspects, the one or more panels include a preferred panel that is identified based at least in part on one or more settings of the UE and a best panel associated with a maximum beamforming gain.

In a fifth aspect, alone or in combination with one or more of the first through fourth aspects, the serving beam is selected from one or more beams in the set of candidate beams that are on the preferred panel based at least in part on the preferred panel including at least one beam for which the estimated application layer throughput satisfies the application layer throughput requirement.

In a sixth aspect, alone or in combination with one or more of the first through fifth aspects, the serving beam is selected from one or more beams in the set of candidate beams that are on the best panel based at least in part on the estimated application layer throughput associated with each beam on the preferred panel failing to satisfy the application layer throughput requirement.

In a seventh aspect, alone or in combination with one or more of the first through sixth aspects, the serving beam is used to communicate on one or more of a PUCCH, a PUSCH, a PDCCH, or a PDSCH.

In an eighth aspect, alone or in combination with one or more of the first through seventh aspects, process 500 includes determining, based at least in part on the application layer throughput requirement, a threshold at which an RSRP measurement associated with a beam satisfies the application layer throughput requirement.

In a ninth aspect, alone or in combination with one or more of the first through eighth aspects, determining the threshold includes mapping the application layer throughput requirement to a physical layer throughput requirement based at least in part on a scaling factor, and mapping the physical layer throughput requirement to the threshold.

In a tenth aspect, alone or in combination with one or more of the first through ninth aspects, mapping the physical layer throughput requirement to the threshold includes mapping the physical layer throughput requirement to a spectral efficiency requirement based at least in part on one or more of a number of active component carriers, a TDD pattern, or a subcarrier spacing, and mapping the spectral efficiency requirement to the threshold.

In an eleventh aspect, alone or in combination with one or more of the first through tenth aspects, mapping the spectral efficiency requirement to the threshold includes mapping the spectral efficiency requirement to an SNR requirement, and mapping the SNR requirement to the threshold.

In a twelfth aspect, alone or in combination with one or more of the first through eleventh aspects, the SNR requirement includes a downlink SNR requirement, and the threshold is based at least in part on the downlink SNR requirement and an estimated noise power at the UE.

In a thirteenth aspect, alone or in combination with one or more of the first through twelfth aspects, the SNR requirement includes an uplink SNR requirement, and the threshold is based at least in part on the uplink SNR requirement and one or more of a maximum transmit power, a transmit power at a base station, or an estimated noise power at the base station.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
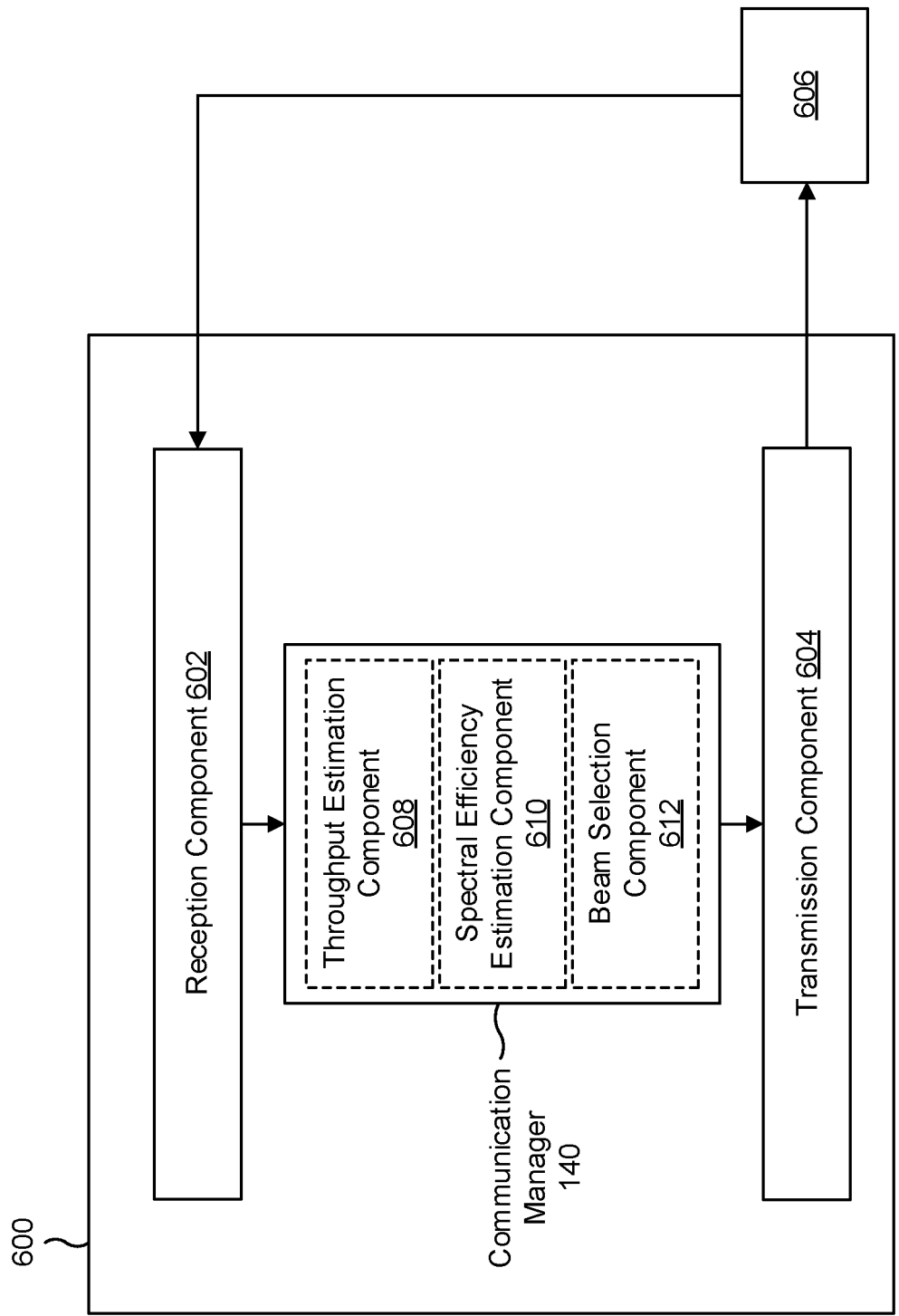
FIG. 6 is a diagram of an example apparatus for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a throughput estimation component 608, a spectral efficiency estimation component 610, or a beam selection component 612, among other examples.

In some aspects, the apparatus 600 may be configured to perform one or more operations described herein in connection with FIGS. 4A-4B. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The throughput estimation component 608 may estimate, for each beam at one or more beam levels on one or more antenna panels, an application layer throughput based at least in part on an RSRP measurement, wherein the one or more beam levels are each associated with a number of antenna elements. The beam selection component 612 may generate a set of candidate beams that includes, at each of the one or more beam levels, one or more beams for which the respective estimated application layer throughput satisfies an application layer throughput requirement. The beam selection component 612 may select, from the set of candidate beams, a serving beam for which the estimated application layer throughput satisfies the application layer throughput requirement with a fewest number of antenna elements.

The spectral efficiency estimation component 610 may estimate a spectral efficiency for each beam in the set of candidate beams, wherein the serving beam is selected from one or more beams in the set of candidate beams for which the spectral efficiency satisfies the application layer throughput requirement.

The throughput estimation component 608 may determine, based at least in part on the application layer throughput requirement, a threshold at which an RSRP measurement associated with a beam satisfies the application layer throughput requirement.

The throughput estimation component 608 may map the application layer throughput requirement to a physical layer throughput requirement based at least in part on a scaling factor. The throughput estimation component 608 may map the physical layer throughput requirement to the threshold.

The throughput estimation component 608 may map the physical layer throughput requirement to a spectral efficiency requirement based at least in part on one or more of a number of active component carriers, a TDD pattern, or a subcarrier spacing. The throughput estimation component 608 may map the spectral efficiency requirement to the threshold.

The throughput estimation component 608 may map the spectral efficiency requirement to an SNR requirement. The throughput estimation component 608 may map the SNR requirement to the threshold.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a UE, comprising: estimating, for each beam at one or more beam levels on one or more antenna panels, an application layer throughput based at least in part on an RSRP measurement, wherein the one or more beam levels are each associated with a number of antenna elements; generating a set of candidate beams that includes, at each of the one or more beam levels, one or more beams for which the respective estimated application layer throughput satisfies an application layer throughput requirement; and selecting, from the set of candidate beams, a serving beam for which the estimated application layer throughput satisfies the application layer throughput requirement with a fewest number of antenna elements.

Aspect 2: The method of Aspect 1, wherein the application layer throughput is estimated for each beam based at least in part on the RSRP measurement associated with an SSB received via the respective beam.

Aspect 3: The method of any of Aspects 1-2, further comprising: estimating a spectral efficiency for each beam in the set of candidate beams, wherein the serving beam is selected from one or more beams in the set of candidate beams for which the spectral efficiency satisfies the application layer throughput requirement.

Aspect 4: The method of Aspect 3, wherein the spectral efficiency is estimated for each beam in the set of candidate beams based at least in part on a CSI-RS received via the respective beam.

Aspect 5: The method of any of Aspects 1-4, wherein the one or more panels include a preferred panel that is identified based at least in part on one or more settings of the UE and a best panel associated with a maximum beamforming gain.

Aspect 6: The method of Aspect 5, wherein the serving beam is selected from one or more beams in the set of candidate beams that are on the preferred panel based at least in part on the preferred panel including at least one beam for which the estimated application layer throughput satisfies the application layer throughput requirement.

Aspect 7: The method of Aspect 5, wherein the serving beam is selected from one or more beams in the set of candidate beams that are on the best panel based at least in part on the estimated application layer throughput associated with each beam on the preferred panel failing to satisfy the application layer throughput requirement.

Aspect 8: The method of any of Aspects 1-7, wherein the serving beam is used to communicate on one or more of a PUCCH, a PUSCH, a PDCCH, or a PDSCH.

Aspect 9: The method of any of Aspects 1-8, further comprising: determining, based at least in part on the application layer throughput requirement, a threshold at which an RSRP measurement associated with a beam satisfies the application layer throughput requirement.

Aspect 10: The method of Aspect 9, wherein determining the threshold includes: mapping the application layer throughput requirement to a physical layer throughput requirement based at least in part on a scaling factor; and mapping the physical layer throughput requirement to the threshold.

Aspect 11: The method of Aspect 10, wherein mapping the physical layer throughput requirement to the threshold includes: mapping the physical layer throughput requirement to a spectral efficiency requirement based at least in part on one or more of a number of active component carriers, a time division duplexing pattern, or a subcarrier spacing; and mapping the spectral efficiency requirement to the threshold.

Aspect 12: The method of Aspect 11, wherein mapping the spectral efficiency requirement to the threshold includes: mapping the spectral efficiency requirement to an SNR requirement; and mapping the SNR requirement to the threshold.

Aspect 13: The method of Aspect 12, wherein the SNR requirement includes a downlink SNR requirement, and wherein the threshold is based at least in part on the downlink SNR requirement and an estimated noise power at the UE.

Aspect 14: The method of any of Aspects 12-13, wherein the SNR requirement includes an uplink SNR requirement, and wherein the threshold is based at least in part on the uplink SNR requirement and one or more of a maximum transmit power, a transmit power at a base station, or an estimated noise power at the base station.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      estimate, for each beam at one or more beam levels on one or more antenna panels, an application layer throughput based at least in part on a reference signal received power (RSRP) measurement, wherein the one or more beam levels are each associated with a number of antenna elements;
      generate a set of candidate beams that includes, at each of the one or more beam levels, one or more beams for which the respective estimated application layer throughput satisfies an application layer throughput requirement; and
      select, from the set of candidate beams, a serving beam for which the estimated application layer throughput satisfies the application layer throughput requirement with a fewest number of antenna elements.

2. The UE of claim 1, wherein the application layer throughput is estimated for each beam based at least in part on the RSRP measurement associated with a synchronization signal block (SSB) received via the respective beam.

3. The UE of claim 1, wherein the one or more processors are further configured to:
   estimate a spectral efficiency for each beam in the set of candidate beams, wherein the serving beam is selected from one or more beams in the set of candidate beams for which the spectral efficiency satisfies the application layer throughput requirement.

4. The UE of claim 3, wherein the spectral efficiency is estimated for each beam in the set of candidate beams based at least in part on a channel state information reference signal (CSI-RS) received via the respective beam.

5. The UE of claim 1, wherein the one or more panels include a preferred panel that is identified based at least in part on one or more settings of the UE and a best panel associated with a maximum beamforming gain.

6. The UE of claim 5, wherein the serving beam is selected from one or more beams in the set of candidate beams that are on the preferred panel based at least in part on the preferred panel including at least one beam for which the estimated application layer throughput satisfies the application layer throughput requirement.

7. The UE of claim 5, wherein the serving beam is selected from one or more beams in the set of candidate beams that are on the best panel based at least in part on the estimated application layer throughput associated with each beam on the preferred panel failing to satisfy the application layer throughput requirement.

8. The UE of claim 1, wherein the serving beam is used to communicate on one or more of a physical uplink control channel, a physical uplink shared channel, a physical downlink control channel, or a physical downlink shared channel.

9. The UE of claim 1, wherein the one or more processors are further configured to:
   determine, based at least in part on the application layer throughput requirement, a threshold at which an RSRP measurement associated with a beam satisfies the application layer throughput requirement.

10. The UE of claim 9, wherein the one or more processors, to determine the threshold, are configured to:
    map the application layer throughput requirement to a physical layer throughput requirement based at least in part on a scaling factor; and
    map the physical layer throughput requirement to the threshold.

11. The UE of claim 10, wherein the one or more processors, to map the physical layer throughput requirement to the threshold, are configured to:
    map the physical layer throughput requirement to a spectral efficiency requirement based at least in part on one or more of a number of active component carriers, a time division duplexing pattern, or a subcarrier spacing; and
    map the spectral efficiency requirement to the threshold.

12. The UE of claim 11, wherein the one or more processors, to map the spectral efficiency requirement to the threshold, are configured to:
    map the spectral efficiency requirement to a signal-to-noise ratio (SNR) requirement; and
    map the SNR requirement to the threshold.

13. The UE of claim 12, wherein the SNR requirement includes a downlink SNR requirement, and wherein the threshold is based at least in part on the downlink SNR requirement and an estimated noise power at the UE.

14. The UE of claim 12, wherein the SNR requirement includes an uplink SNR requirement, and wherein the threshold is based at least in part on the uplink SNR requirement and one or more of a maximum transmit power, a transmit power at a base station, or an estimated noise power at the base station.

15. A method of wireless communication performed by a user equipment (UE), comprising:
    estimating, for each beam at one or more beam levels on one or more antenna panels, an application layer throughput based at least in part on a reference signal received power (RSRP) measurement, wherein the one or more beam levels are each associated with a number of antenna elements;
    generating a set of candidate beams that includes, at each of the one or more beam levels, one or more beams for which the respective estimated application layer throughput satisfies an application layer throughput requirement; and
    selecting, from the set of candidate beams, a serving beam for which the estimated application layer throughput satisfies the application layer throughput requirement with a fewest number of antenna elements.

16. The method of claim 15, wherein the application layer throughput is estimated for each beam based at least in part on the RSRP measurement associated with a synchronization signal block (SSB) received via the respective beam.

17. The method of claim 15, further comprising:
    estimating a spectral efficiency for each beam in the set of candidate beams, wherein the serving beam is selected from one or more beams in the set of candidate beams for which the spectral efficiency satisfies the application layer throughput requirement.

18. The method of claim 17, wherein the spectral efficiency is estimated for each beam in the set of candidate beams based at least in part on a channel state information reference signal (CSI-RS) received via the respective beam.

19. The method of claim 15, wherein the one or more panels include a preferred panel that is identified based at least in part on one or more settings of the UE and a best panel associated with a maximum beamforming gain.

20. The method of claim 19, wherein the serving beam is selected from one or more beams in the set of candidate beams that are on the preferred panel based at least in part on the preferred panel including at least one beam for which the estimated application layer throughput satisfies the application layer throughput requirement.

21. The method of claim 19, wherein the serving beam is selected from one or more beams in the set of candidate beams that are on the best panel based at least in part on the estimated application layer throughput associated with each beam on the preferred panel failing to satisfy the application layer throughput requirement.

22. The method of claim 15, wherein the serving beam is used to communicate on one or more of a physical uplink control channel, a physical uplink shared channel, a physical downlink control channel, or a physical downlink shared channel.

23. The method of claim 15, further comprising:
    determining, based at least in part on the application layer throughput requirement, a threshold at which an RSRP measurement associated with a beam satisfies the application layer throughput requirement.

24. The method of claim 23, wherein determining the threshold includes:
    mapping the application layer throughput requirement to a physical layer throughput requirement based at least in part on a scaling factor; and
    mapping the physical layer throughput requirement to the threshold.

25. The method of claim 24, wherein mapping the physical layer throughput requirement to the threshold includes:
    mapping the physical layer throughput requirement to a spectral efficiency requirement based at least in part on one or more of a number of active component carriers, a time division duplexing pattern, or a subcarrier spacing; and
    mapping the spectral efficiency requirement to the threshold.

26. The method of claim 25, wherein mapping the spectral efficiency requirement to the threshold includes:
    mapping the spectral efficiency requirement to a signal-to-noise ratio (SNR) requirement; and
    mapping the SNR requirement to the threshold.

27. The method of claim 26, wherein the SNR requirement includes a downlink SNR requirement, and wherein the threshold is based at least in part on the downlink SNR requirement and an estimated noise power at the UE.

28. The method of claim 26, wherein the SNR requirement includes an uplink SNR requirement, and wherein the threshold is based at least in part on the uplink SNR requirement and one or more of a maximum transmit power, a transmit power at a base station, or an estimated noise power at the base station.

29. A non-transitory computer-readable medium storing a set of instructions for wireless communication, the set of instructions comprising:
    one or more instructions that, when executed by one or more processors of a user equipment (UE), cause the UE to:
        estimate, for each beam at one or more beam levels on one or more antenna panels, an application layer throughput based at least in part on a reference signal received power (RSRP) measurement, wherein the one or more beam levels are each associated with a number of antenna elements;
        generate a set of candidate beams that includes, at each of the one or more beam levels, one or more beams for which the respective estimated application layer throughput satisfies an application layer throughput requirement; and
        select, from the set of candidate beams, a serving beam for which the estimated application layer throughput satisfies the application layer throughput requirement with a fewest number of antenna elements.

30. An apparatus for wireless communication, comprising:
    means for estimating, for each beam at one or more beam levels on one or more antenna panels, an application layer throughput based at least in part on a reference signal received power (RSRP) measurement, wherein the one or more beam levels are each associated with a number of antenna elements;
    means for generating a set of candidate beams that includes, at each of the one or more beam levels, one or more beams for which the respective estimated application layer throughput satisfies an application layer throughput requirement; and means for selecting, from the set of candidate beams, a serving beam for which the estimated application layer throughput satisfies the application layer throughput requirement with a fewest number of antenna elements.

* * * * *